Jan. 12, 1932.  W. W. ODELL  1,841,201
PROCESS FOR MAKING COMBUSTIBLE GAS
Original Filed March 4, 1927
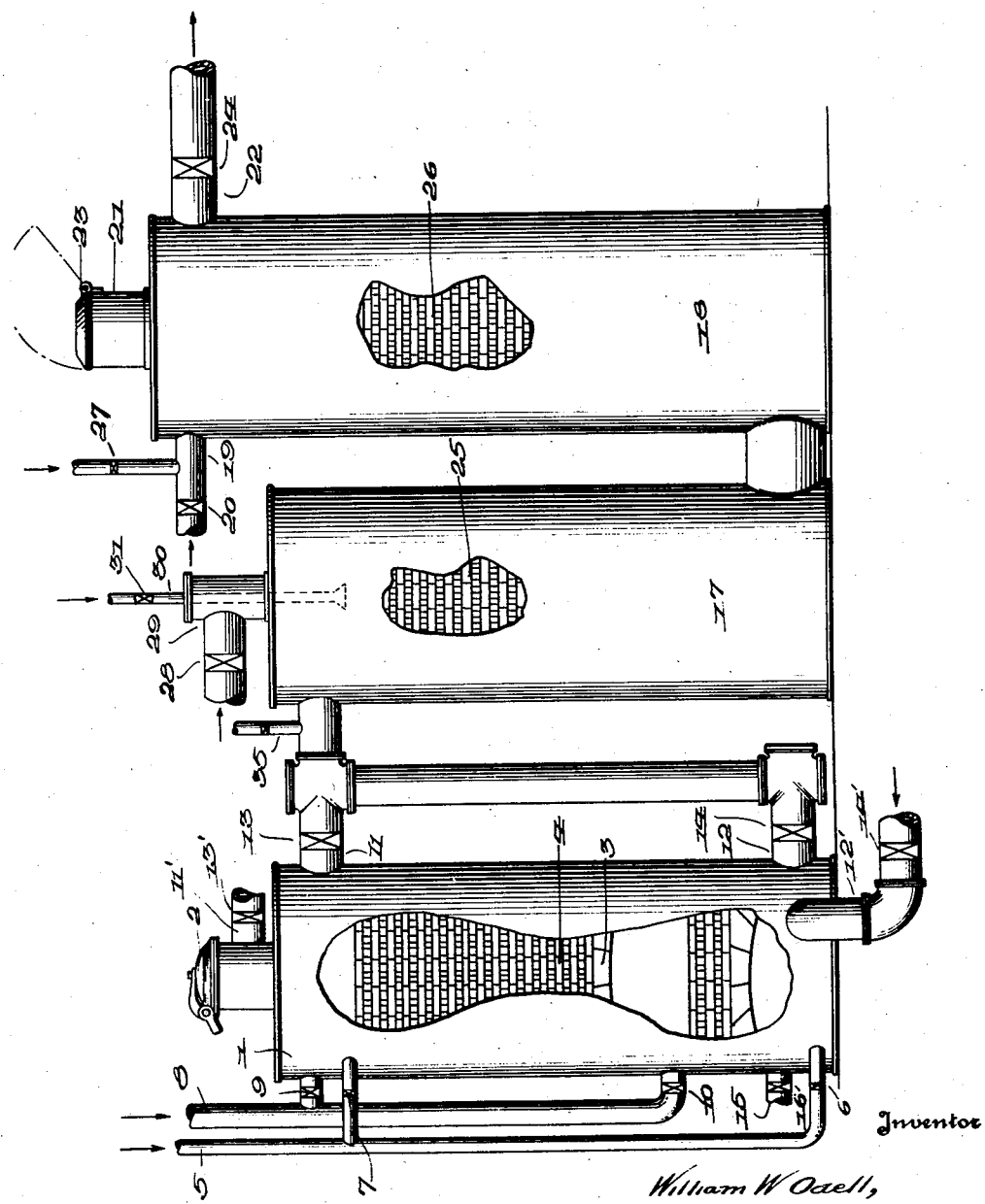
Inventor
William W Odell,
By Pennie, Davis, Marvin and Edmonds
Attorney Patented Jan. 12, 1932

1,841,201

UNITED STATES PATENT OFFICE

WILLIAM W. ODELL, OF NEW YORK, N. Y., ASSIGNOR TO COLUMBIA ENGINEERING & MANAGEMENT CORPORATION, OF NEW YORK, N. Y., A CORPORATION OF OHIO

PROCESS FOR MAKING COMBUSTIBLE GAS

Original application filed March 4, 1927, Serial No. 172,736. Divided and this application filed May 8, 1930. Serial No. 450,797.

This invention relates to a process which consists in generating combustible gas containing hydrogen and carbon monoxide, using one or more hydrocarbons of the paraffin series as a fuel for the generation of at least a part of it; natural gas being a ready and low priced source of supply of said hydrocarbons. An important part of the process is based upon the chemical reactions occurring when the paraffin hydrocarbons are subjected to the action of heat, i. e., when they are caused to contact heated surfaces, particularly in the presence of steam; the contacting surface may be carbonaceous or other substances.

An object of my invention is to utilize economically the paraffin hydrocarbons which, in the natural-gas fields are so frequently wasted.

Another object of my invention is to produce a gas, using said hydrocarbons, which will have the right proportional amounts of carbon monoxide (CO) and hydrogen ($H_2$) for the synthetic production of methanol, i. e., about 2 parts of $H_2$ to one part of CO, since the methanol reaction is represented by the equation, (1)  $CO + 2H_2 = CH_3OH$ Further objects of my invention are to provide a flexible means of producing gas of standard quality using paraffin hydrocarbons, in chemical reactions, in the generation of a part thereof; to produce water gas with higher efficiency and at a lower cost than when using solid fuel alone, by the use of said hydrocarbons in chemical reaction; to use gaseous hydrocarbons in substantially the pure state or in simple mixtures, and to increase the gas making capacity of the generator of a carburetted water-gas set.

It should be noted that with the advent of the new and improved oil-cracking processes in oil refining practice so much of the low-density hydrocarbons is formed that a limit has been put upon the amount of the latter which can be present in natural-gas gasoline used in blending; and this has resulted, in very recent months, in the availability of large quantities of $C_2H_6$, $C_3H_8$, and $C_4H_{10}$, which can be obtained either in a high degree of purity or mixed with each other or with methane. The propane ($C_3H_8$) and butane ($C_4H_{10}$) are now wasted to a large extent by being burned in "pilots" in some of the natural-gas fields, even in those fields where the methane and ethane are piped to centres of consumption.

I find it possible to produce hydrogen and carbon monoxide, using the paraffin hydrocarbons, at a lower cost than when using solid fuel only at nominal prices. I also find that this gas can be enriched with hydrocarbons at a lower cost than that of ordinary carburetted water gas.

The chemical equations of interest and which are alluded to hereinafter are as follows:

(2) $CH_4$ upon heat cracking $= 2H_2$
(3) $C_2H_6$ upon heat cracking $= 2C + 3H_2$
(4) $C_3H_8$ upon heat cracking $= 3C + 4H_2$
(5) $C_4H_{10}$ upon heat cracking $= 4C + 5H_2$
(6) $CH_4 + H_2O = CO + 3H_2$
(7) $C_2H_6 + 2H_2O = 2CO + 5H_2$
(8) $C_3H_8 + 3H_2O = 3CO + 7H_2$
(9) $C_4H_{10} + 4H_2O = 4CO + 9H_2$
(10) $C + H_2O = CO + H_2$ In the above there are two classes of reactions; Equations 2 to 5 inclusive show the effect of completely cracking the paraffins by the application of heat; and equations 6 to 9 inclusive show the effect of heating them in the presence of sufficient steam to combine with the carbon by the water-gas reaction as shown in Equation 10. It is obvious then that in the generation of the ideal water-gas ($CO + H_2$ mixture) using paraffin hydrocarbons there is a preferred proportion of steam and carbon to be used with the latter. In common practice in generating water-gas a much larger amount of steam is necessarily used than enters into the chemical reaction and this will hold true in this instance. This ratio can be varied at will within certain limits; Equation 6 shows the conditions for a ratio of 3 to 1 and the other equations show smaller ratios; that in Equation 10 in which no hydrocarbons enter the reaction, being 1 to 1. The low limit is about 1 to 1, but there is practically no upper-limit ratio short of infinity when reactions 2 to 5 are considered. The latter reactions do not represent efficient gasification and are not of themselves new. The process of making water gas—(CO and $H_2$ mixtures) having a hydrogen-carbon monoxide ratio of substantially 2 to 1 by the high temperature reactions represented by equations, or combinations of them, using a substantially definite proportion of hydrocarbons and steam in the reactions as shown, is believed to be a new combination in the art. It will be noted that propane ($C_3H_8$) and butane ($C_4H_{10}$) yield a gas, by reactions represented in Equations 8 and 9, which is quite satisfactory for the production of methanol ($CH_3OH$). Thus it is apparent that the reaction shown in Equation 10, commonly known as the water-gas reaction, need not enter into or become a part of the reaction producing a mixture of $H_2$ and CO—other than in the conversion of the carbon of hydrocarbons to CO. In other words, additional carbon is not necessary. Also it is to be noted that the gas generated is substantially free from suspended carbon thereby making it unnecessary to treat the gas for the removal of carbon.

The apparatus in which I am able to make gas by my process is shown in the accompanying drawing, in which the figure is a front elevation of a suitable gas generator set, with portions of the shells cut away to show the interior in section for clearness. The generator is shown connected with double checker chambers such as the carburetor and superheater of a carburetted water-gas set, but obviously it can function without the latter.

In the drawing, 1 is the gas generator shell, having door 2 for placing solid contact material shown at 4, and supported as at 3. The steam supply line is shown at 5, having inlet control valves for up and down run steam respectively at 6 and 7. Hydrocarbon gas is supplied to the generator through supply-line 8, having inlet control valves 9 and 10. The offtakes for finished gas are shown at 11, 11', 12 and 12', and the respective control valves are shown at 13, 13', 14 and 14'. Air is supplied through inlet 15 and control valve 16. The checker chambers 17 and 18 are so connected that gas from 13 and 14 can be passed through them and out through offtakes 21 and 22 by controlling valves 23 and 24. A connection for hydrocarbon gas is shown at 19 with control valve 20. Checker brick or contact material is shown at 25 and 26 and a steam control valve at 27 for introducing steam into chamber 18. Secondary air is admitted through 28 and 29, and enriching oil or other carburetting material, is introduced through 30 and 31. A steam inlet for cooling back-flow gas and valves is shown at 35. One procedure for operating by my process for the production of combustible gas, in cycles is as follows: Referring to the drawing, the checker work is blasted with ignited hydrocarbon fuel and air to incandescence by opening valve 16 and admitting air through 15 while injecting hydrocarbon through 10. The air blast gases, when they contain combustible matter, may be burned in chambers 17 and 18 by introducing air through 28 and 29 and then discharged through 21 and 23. The air blasting is discontinued, valve 16 is closed, cap 23 is closed and valves 6 and 24 are opened, valves 13 and 10 remaining open, and a regular hydrocarbon gas and steam run is made. Either alternate up and down runs are made or split-runs are made during the steaming periods; one air-blasting and one steaming period making a complete cycle. The cycles are repeated. When ordinary down runs are made, valves 6, 10, 13 and 13' are closed and valves 7, 9 and 14 are opened. During the admission of steam during the up-runs, hydrocarbon gas is admitted to the generator in contact with contact material 4 in controlled amounts during at least the fore-part of the run, by operating valve 10. In this manner solid fuel is not consumed in the generator during the steam-run periods and less heat energy is used per thousand cubic feet of gas made, than in generating water gas in the ordinary manner from solid fuel. The hydrocarbon gas may be introduced during each up-run, during a portion of each run during both up and down runs, or during a certain predetermined percentage of the total number of runs. When steam only is passed through generator 1, it is superheated before reaching chambers 17 and 18. Further it "cleans up" any deposit of carbon lodged in the checker work in 1. It will be apparent that there are conditions when a straight steam run is desired, not only for the superheating of steam subsequently used in the enriching chambers, but also for the double purpose of "cleaning up" carbon and maintaining a proper distribution of heat in the primary generator 1. Furthermore, an excess of hydrocarbon gas may be used, that is, beyond the normal end of the run period. In the latter period the gas is not appreciably cracked and functions chiefly as a heat-carrying agent, helping to equalize the temperature in generator 1, and to carburet the "make gas". When a mixture of paraffin hydrocarbons are introduced into the generator 1, as through 10 during a prolonged part of an up-run, the higher members only of the series are appreciably cracked. In this manner the amount of cracking and the nature of the finished gas can be predetermined. Attention is called to the fact that the heat absorbed in the generator according to Equation 6 is much less than is absorbed by Equation 10, hence for a definite temperature condition in the generator checker work the quantity of gas which can be made according to the former is about double that which can be made according to Equation 10. Similar comparisons can be made between Equation 10 and Equations 7, 8 and 9, the volume ratios being slightly different in each case, but the same general relation exists as a study of the equations will reveal. It appears that not only is the capacity of the generator increased when reforming gas, and the gasification efficiency raised above that of normal water-gas practice, but the overall efficiency in making reformed and carbureted reformed gas and employing hydrocarbon gas as described is higher than other processes using hydrocarbons, such as the combined oil gas reformed gas process and the like, so far as I am aware.

So far, the use of hydrocarbon gas on the up-runs only, has been discussed. It can be and is used when desired on the down-runs as well. Means are provided for introducing the hydrocarbon gas through valve 20 and inlet 19, and steam through 27. In this manner the gas, and preferably, the steam also are preheated before reaching the reaction zones by heat energy otherwise wasted. In fact a considerable amount of reactions 6, 7, 8 and 9 takes place in the checker chambers 17 and 18 before reaching generator 1. To a large extent the amount of carbon formed during the run when operating in the manner described above is controlled by varying the proportions of steam and hydrocarbon gas used. When using a large proportion of hydrocarbon gas there is a tendency for some carbon to form and deposit in the checker work. Increasing the steam and hydrocarbon gas ratio reduces this deposit to a minimum.

In the generation of gas for use in manufacturing synthetic methanol, when the proportion of CO and $H_2$ must be held within fixed limits and when the latter gases are preferred to the exclusion of other gases, it is necessary to operate with generator temperatures well above the dissociation or reaction temperatures; this is provided for by adjusting the amount of air used with respect to the steam and hydrocarbon gas used; short cycles are used under these conditions. After the generator is in operation it is only necessary to analyze the generated gas to determine whether or not the cycle should be changed and whether the air, steam and hydrocarbon gas are properly proportioned. For example, with insufficient air blasting (heating of the checker work during the heating period) or its equivalent, too much steam and hydrocarbon gas, the percentage of $CO_2$ and $CH_4$ in the generated gas increases. With sufficient air blasting, the CO content of the generated gas increases as the ratio steam to hydrocarbon gas increases. Should it be desirable to materially increase the content of $H_2$ beyond that shown in Equations 6 to 10 it is only necessary to materially reduce the amount of steam used and allow reactions 2 to 5 to take place according to the hydrocarbon used.

The paraffins are not the only hydrocarbon gases which can be used in the production of mixed CO and $H_2$ by chemical reaction with steam; they are mentioned in particular because they are commercially available in large quantities. Ethylene ($C_2H_4$) a by-product in the cracking of petroleum in the manufacture of gasoline is also a suitable hydrocarbon for the purpose, as shown by the following equations:

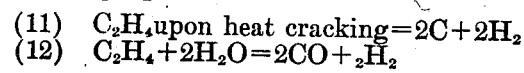

(11)  $C_2H_4$ upon heat cracking $= 2C + 2H_2$
(12)  $C_2H_4 + 2H_2O = 2CO + 2H_2$ One way of converting $C_2H_4$ into methanol is shown by Equations 12 and 1. It will be noted that in Equation 12 the gas formed has the right proportion of CO and $H_2$ for Equation 1, hence for the latter purpose, when using $C_2H_4$ in the generator, it is desirable to so operate that the generated gas is substantially as shown in Equation 12. One of the fundamentals of my process, then, consists in causing steam and hydrocarbon gas to be introduced simultaneously into an incandescent mass of solids, which mass may or may not comprise coal, coke or the like, and causing said steam and gas to react chemically in definite proportions which are substantially and at least one molecule of $H_2O$ for every carbon atom present in the reacting hydrocarbon gas. The complete cycle of operation, using a multiple-shell set, as shown in the drawing, and using hydrocarbon gas on both the up and down runs is substantially as follows: Up blast the generator 1 with air and a combustible heating gas until the checker bricks are incandescent, meanwhile conducting the blast gas into the attached checker chambers 17 and 18, burning its combustible matter therein by the addition of secondary air admitted through 29 and causing the burned gas to pass out of said chambers through 23; discontinuing the air-blasting and introducing both steam and hydrocarbon gas into generator 1 through 6 and 10 or 7 and 9, and removing the reaction products from the preferred offtakes and causing them to pass through the checker chambers 17 and 18, discontinuing this steam and hydrocarbon gas run and repeating the cycle, except that the subsequent run is made as follows: Steam and hydrocarbon gas are introduced into the top of the superheater 18 in substantially molecular proportions, caused to react at least in part in chambers 17 and 18 and conducted into the generator 1 preferably from above the checkers, the finished gas being removed from beneath them through 12' and 14'. Obviously, instead of making alternate up and down runs, split runs can be made or a combination of split runs and up and down runs; this is a common practice in water gas generation. Likewise, steam alone may be used during some of the runs, omitting the hydrocarbon gas in order to correct any deviation from the selected or desired percentages of carbon monoxide and hydrogen in the finished gas, as well as for reasons already given.

When it is intended to use the gas made as city-gas, enricher may be added to generated gas flowing through the checker chambers 17 and 18 or elsewhere. If oil is used as enricher, it can be cracked more efficiently in the atmosphere of $CO+H_2$ than in the oil-gas process; the efficiency of gasification in the latter process being less than 50 percent., whereas with the same gas oil the gasification efficiency in the cracking of said oil in an atmosphere of $CO+H_2$ is 70 percent. or more. When sufficient hydrocarbon gas is available, I prefer to enrich the $CO+H_2$ mixture by introducing the former into the latter in the checker chamber 17. A special inlet for it is not shown for simplicity, since about the same result is obtained by opening valve 9 on the up runs and valve 10 on the down runs. This method of introducing the enricher tends to keep valves 13 and 14 cool.

There are conditions and localities in this country where it is necessary to alter the gas making process used in generating city gas because of a variation in the supply of natural gas and variation in demand for gas. I believe I have a "flexible" unit which may be subjected to considerable variation in operation without materially altering the quality of the finished gas. For example, in the apparatus shown in the drawing, water-gas ($CO+2H_2$) can be made in the generator 1 almost entirely from hydrocarbon gas, such as natural gas, and enriched with natural gas when the supply of the latter is sufficient to meet the demand. On the other hand, when this supply is low, the CO and $H_2$ mixture can be made in the generator essentially from other fuel, using the natural gas for enriching only; in extreme cases the enriching can in part be done by introducing gas oil into the checker chambers, as in the standard carburetted water-gas process. It may be done by introducing hydrocarbon gas through 10 or 9 on up and down runs respectively during the latter part of the steam run, or after the steam-gas runs.

In making straight CO and $H_2$ mixtures, containing only small percentages of other gases, from hydrocarbon gas as a base raw material, or from both hydrocarbon gas and other fuel, the temperature of the checker bricks in chambers 17 and 18 should be appreciably higher than is common practice in making carburetted water-gas. The temperature should be preferably above 1700 degrees Fahrenheit; average temperatures of 1750 and 1900 degrees Fahrenheit are satisfactory. When gas oil is used and a carburetted gas, such as city gas, is made, lower temperatures are more satisfactory, namely, 1400 to 1550 degrees Fahrenheit. The latter is also true when carburetting by introducing hydrocarbon gas into the gas entering checker chambers 17 and 18 from the generator.

Coal, coke or the like, is a satisfactory filler for generator 1 and is a splendid contact medium for carrying on reactions as represented by Equations 2 to 12 inclusive, but for the reactions represented by Equations 2 to 9 inclusive, and 11 and 12, solid fuel is not essential; a hot refractory surface is satisfactory as shown in the drawing.

Referring again to the drawing, when it is desirable not to completely crack all of the hydrocarbon gas used in the process, and yet to maintain high temperatures in the chambers 17 and 18, the operation may be so conducted that the gas produced in the generator does not pass through chambers 17 and 18. In this manner the checker bricks in the latter chambers can be used to full advantage for producing carbon monoxide and hydrogen from steam and hydrocarbon gas by admitting the latter materials respectively through 27 and 20. The complete operation is as follows: first, air-blast and burn a gaseous fuel in 1, conducting blast gas into checker chambers 17 and 18, through 13, simultaneously admitting secondary air to 17 through 28 for combustion of the blast gas, discharging the products of combustion through 21 and 23. Now discontinue the air blasting, close stack 23 and introduce steam through 6 and hydrocarbon gas through 10, taking the resulting product off through 13', admitting hydrocarbon gas to generator through 9 also when enriched gas is desired. A subsequent cycle is made by first air-blasting as just described and then, when the checker bricks in the different chambers are sufficiently hot, discontinuing the air-blasting, closing stack 23, introducing steam and hydrocarbon gas simultaneously through 27 and 20 respectively, causing them to react chemically during their passage through 18 and 17, conducting the reaction products and any excess of either gas or steam or both out of 17 through the generator 1 and out of generator; the latter step may consist in passing the gaseous products from 17 through 13 and 11, down through the checkers and out through 12' and 14', or, when 13 is closed, through 14, up through the checkers in 1 and out through 13'. When said gaseous products from 17 are passing through chamber 1, either upwardly or downwardly, additional steam may be introduced therein simultaneously with them by opening respectively valves 6 and 7. When sufficient hydrocarbon gas is available it also may be introduced into generator 1 along with the steam and the gaseous products from 17 by opening valve 10 before up runs and valve 9 before down runs. Furthermore, when the enriching is done with hydrocarbon gas, both valves 9 and 10 are open during up and down runs, the extent of enriching in this instance depending upon the relative amounts of hydrocarbon gas used in the reactions and introduced after the products have emerged from the contact mass.

My gas-generating apparatus is so designed that a substantially constant quality of gas can be made therein, using varying relative amounts of steam and hydrocarbon gas in the process. The temperatures in the checker chambers 17 and 18 are maintained by the combustion of blast gas therein, but when necessary or desired additional gas is supplied thereto by opening valve 9 during the upward air blasting of the generator fuel. Finished gas can be taken from generator through offtakes and valves at top and bottom (above and below the contact mass) as shown at 13' and 14', besides the offtakes leading through the checker chambers.

I usually operate at temperatures such that the higher hydrocarbons are reformed to lower hydrocarbons, hydrogen and carbon monoxide.

In the following claims the term "checker material" is intended to be inclusive of any mass of solid refractory material, porous to passage of the gas therethrough, and which offers the contact surface and intimacy of contact required for the high temperature gas reactions resulting in the formation of carbon monoxide and hydrogen.

This application is a division of my copending application Serial No. 172,736, filed March 4, 1927, now Patent No. 1,762,100.

I claim:

1. A process of generating gas which gas is substantially free from suspended carbon resulting from hydrocarbon decomposition, which consists in introducing hydrocarbon gas into a mass of non-combustible checker material heated to a degree sufficient to decompose the hydrocarbon gas, simultaneously introducing steam therewith in amount sufficient to effect substantially complete reaction with the hydrocarbon gas, thereby producing a gas comprising essentially hydrogen and carbon monoxide and in which the ratio of hydrogen to carbon monoxide is substantially from two to one to three to one.

2. A process of generating gas which gas is substantially free from suspended carbon resulting from hydrocarbon decomposition, which consists in introducing hydrocarbon gas into a mass of non-combustible checker material heated to a degree sufficient to decompose the hydrocarbon gas, simultaneously introducing steam therewith in amount sufficient to effect substantially complete reaction with the hydrocarbon gas, thereby producing a gas comprising essentially hydrogen and carbon monoxide and in which the ratio of hydrogen to carbon monoxide is substantially two to one.

3. A process of generating gas which gas is substantially free from suspended carbon resulting from hydrocarbon decomposition, which consists in introducing hydrocarbon gas of the paraffin series into a mass of non-combustible checker material heated to a degree sufficient to decompose the hydrocarbon gas, simultaneously introducing steam therewith in amount sufficient to effect substantially complete reaction with the hydrocarbon gas, thereby producing a gas comprising essentially hydrogen and carbon monoxide and in which the ratio of hydrogen to carbon monoxide is substantially from two to one to three to one.

4. A process of generating gas which gas is substantially free from suspended carbon resulting from hydrocarbon decomposition, which consists in introducing hydrocarbon gas of the paraffin series into a mass of non-combustible checker material heated to a degree sufficient to decompose the hydrocarbon gas, simultaneously introducing steam therewith in amount sufficient to effect substantially complete reaction with the hydrocarbon gas, thereby producing gas comprising essentially hydrogen and carbon monoxide and in which the ratio of hydrogen to carbon monoxide is substantially two to one.

5. A process of generating gas which gas is substantially free from suspended carbon resulting from hydrocarbon decomposition, which consists in introducing hydrocarbon gas into a mass of non-combustible checker material heated to a degree sufficient to decompose the hydrocarbon gas and to a temperature sufficient for a water gas reaction to occur, simultaneously introducing steam therewith in amount sufficient to effect substantially complete reaction with said hydrocarbon gas and simultaneous reaction with carbon in the said mass of fuel to the extent that the resulting gas comprises hydrogen and carbon monoxide in the ratio of substantially two to one.

6. A process of generating gas which gas is substantially free from suspended carbon resulting from hydrocarbon decomposition, which consists in introducing hydrocarbon gas of the paraffin series into a mass of non-combustible checker material heated to a degree sufficient to decompose the hydrocarbon gas and to a temperature sufficient for a water gas reaction to occur, simultaneously introducing steam therewith in amount sufficient to effect substantially complete reaction with said hydrocarbon gas and simultaneous reaction with carbon in the said checker material to the extent that the resulting gas comprises hydrogen and carbon monoxide in the ratio of substantially two to one.

7. A process of generating gas which gas is substantially free from suspended carbon resulting from hydrocarbon decomposition, which consists in introducing hydrocarbon gas into a mass of non-combustible checker material heated to a degree sufficient to decompose the hydrocarbon gas, simultaneously introducing steam therewith in amount sufficient to effect substantially complete reaction with the hydrocarbon gas, thereby producing a gas comprising essentially hydrogen and carbon monoxide and in which the ratio of hydrogen to carbon monoxide is substantially from two to one to three to one, introducing into a stream of the hot gas thus generated gaseous hydrocarbons in amount sufficient to produce an enriched gas being substantially city gas.

8. A process of generating gas which is substantially free from suspended carbon resulting from hydrocarbon decomposition, which consists in introducing hydrocarbon gas into a mass of non-combustible checker material heated to a degree sufficient to decompose the hydrocarbon gas, simultaneously introducing steam therewith in amount sufficient to effect substantially complete reaction with the hydrocarbon gas, thereby producing a gas comprising essentially hydrogen and carbon monoxide and in which the ratio of hydrogen to carbon monoxide is substantially two to one, introducing into a stream of the hot gas thus generated gaseous hydrocarbons in amount sufficient to produce an enriched gas being substantially city gas.

9. The process of generating a combustible gas in intermittent stages, said gas being substantially free from suspended carbon, said combustible gas comprising chiefly hydrogen and carbon monoxide having a hydrogen and carbon monoxide ratio of substantially two to one and being substantially free from unsaturated hydrocarbons consisting in, first heating a bed of non-combustible refractory solid material retained in a suitable gas generator by blasting it with air and combustible fluid until it is heated well above the temperature of decomposition of unsaturated hydrocarbons, discontinuing the heating operation and introducing into said bed of refractory both steam and hydrocarbons in a gaseous state controlling the relative amounts of each to maintain the said hydrogen-carbon monoxide ratio, finally when the temperature is no longer high enough for continued gas generating the gas-making stage is discontinued and the cycle repeated.

10. A process of generating gas which gas is substantially free from suspended carbon resulting from hydrocarbon decomposition, which comprises introducing a gaseous hydrocarbon into a mass of non-combustible checker material heated to a degree sufficient to decompose substantial amounts of said hydrocarbon, simultaneously introducing steam therewith in an amount sufficient to react with a substantial amount of said hydrocarbon, thereby producing a gas the major portion of which is hydrogen and carbon monoxide and in which the ratio of the hydrogen to carbon monoxide is substantially from two to one to three to one.

11. In a process of making combustible gas intermittently, comprising largely hydrogen and carbon monoxide, using gaseous hydrocarbons as a gas making material, which comprises first heating a mass of non-combustible refractory solids retained in a gas generator to a temperature above 1800° F., discontinuing the heating operation and then introducing into said mass of solids proportioned amounts of steam and a gaseous hydrocarbon, causing them to react chemically forming said combustible gas, removing the latter gas from said generator as formed, said combustible gas being substantially free from suspended carbon resulting from the hydrocarbon decomposition.

12. A process of making combustible gas intermittently, comprising largely hydrogen and carbon monoxide, using gaseous hydrocarbons as a gas making material which comprises first heating a mass of non-combustible refractory solids retained in an upright gas generator to a temperature above 1800° F., discontinuing the heating operation, and then introducing into the heated mass proportioned amounts of steam and gaseous hydrocarbons, causing them to react chemically with substantially complete reformation of the hydrocarbon, forming said combustible gas, removing the latter gas from said generator as formed, said combustible gas being substantially free from suspended carbon resulting from hydrocarbon decomposition.

13. The process of intermittently making combustible gas, in which a gaseous hydrocarbon from the cracking of petroleum in the manufacture of gasoline is used as a gas-making material, and which gas is substantially free from suspended carbon and contains hydrogen and carbon monoxide in the ratio of at least two to one, which comprises first heating a mass of solid, non-combustible refractory retained in a generator, to a temperature above 1800° F., discontinuing the heating operation and then introducing into said mass of heated refractory proportioned amounts of steam and said gaseous hydrocarbon and causing them to react chemically with substantially complete reformation of said gaseous hydrocarbon and the formation of said combustible gas by allowing sufficient time of contact for reactions to occur, and removing the latter gas from said generator as formed.

14. A process of making combustible gas intermittently, and in cycles using gaseous hydrocarbons as a gas making material, which comprises heating a bed of non-combustible refractory solids retained in the generator to a temperature above 1800° F., discontinuing the heating operation, introducing into said mass of heated refractory proportioned amounts of both steam and gaseous hydrocarbons, causing said steam and said hydrocarbons to react chemically making a reformed gas substantially free from suspended carbon resulting from the hydrocarbon decomposition, introducing into the stream of said reformed gas both steam and carburetting gas, causing said carburetting gas to react in part with the steam admitted therewith by virtue of contact with a second highly heated bed of non-combustible refractory solids, thereby enriching said reformed gas, the definite amounts of steam used with said gaseous hydrocarbon being substantially that required to prevent the entrainment of suspended carbon in the enriching stage.

In testimony whereof I affix my signature.

WILLIAM W. ODELL.